United States Patent [19]

Lin

[11] Patent Number: 5,422,802

[45] Date of Patent: Jun. 6, 1995

[54] UNIVERSALLY ORIENTED AND MAGNETICALLY ATTRACTED LIGHTING FIXTURE

[76] Inventor: Yeong-Shang Lin, c/o Hung Hsing Patent Service Center P.O. Box 55-1670, Taipei, Taiwan, Prov. of China

[21] Appl. No.: 239,585

[22] Filed: May 9, 1994

[51] Int. Cl.⁶ .................................................. F21S 1/12
[52] U.S. Cl. ................................. 362/269; 362/287; 362/398; 362/427; 362/419; 362/413
[58] Field of Search .............. 362/269, 270, 285, 287, 362/398, 418, 419, 422, 427, 413

[56] References Cited

U.S. PATENT DOCUMENTS

| | | | |
|---|---|---|---|
| 3,239,184 | 3/1966 | Kirkeby | 362/419 X |
| 4,770,384 | 9/1988 | Kuwazima et al. | 362/413 X |
| 5,333,103 | 7/1994 | Cuck | 362/413 |

Primary Examiner—Ira S. Lazarus
Assistant Examiner—Thomas M. Sember

[57] ABSTRACT

A lighting fixture includes a lamp pivotally secured to a neck portion by an axial pivoting device having a magnet secured on the lamp end and a ferromagnetic disk fixed on the end of the neck portion for a mutual magnetic attraction with each other between the magnet and the ferromagnetic disk, at least a supporting arm pivotally secured with the neck portion by a transverse pivoting device having a magnet secured to a neck portion and a ferromagnetic plate secured to the arm for their mutual magnetic attraction, and a base rotatably secured with the supporting arm by a bottom pivoting means having a magnet secured on a lower portion of the supporting arm and a ferromagnetic disk secured on the base for their mutual magnetic attraction, whereby upon a pivotal movement or relative rotation between each magnet and each corresponding ferromagnetic disk or plate of the coupling parts, the lamp can be optionally adjusted to any desired orientation and position as "locked" by magnetic attraction between the relevant coupling parts.

12 Claims, 7 Drawing Sheets

UNIVERSALLY ORIENTED AND MAGNETICALLY ATTRACTED LIGHTING FIXTURE

BACKGROUND OF THE INVENTION

Figure 11:
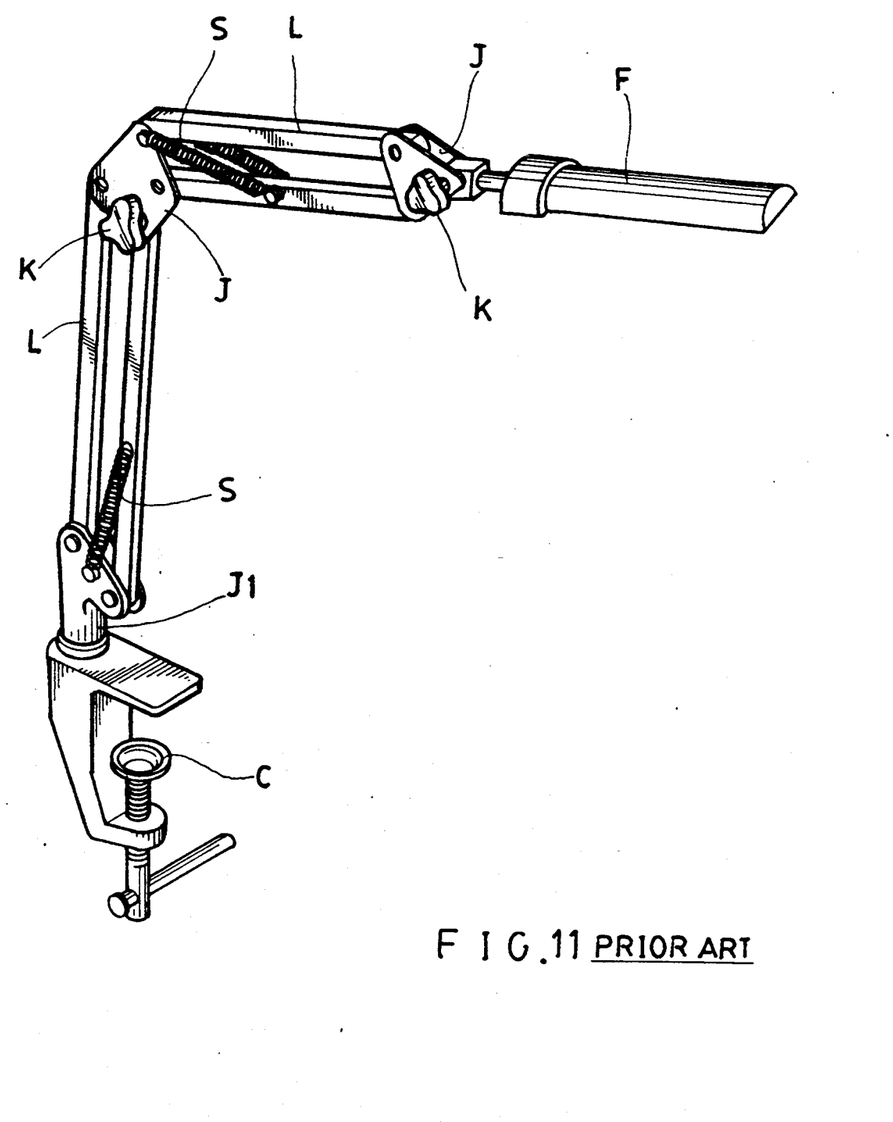
FIG. 11 shows a conventional lighting fixture.

A conventional lighting fixture as shown in FIG. 11 includes: a lamp such as a fluorescent lamp F pivotally secured to plural links L by pivotal joints J, each link L and each pivotal joint J being resiliently linked by a tension spring S and a lower vertical link rotatably mounted on a clamp C for clamping the lighting fixture on a table by a vertically rotatable joint J1. However, when adjusting the lamp F to any desired orientation and position, a knob K should be rotated to fixedly fasten each joint J to prevent its loosening to thereby cause inconvenience for the lamp user.

SUMMARY OF THE INVENTION

The object of the present invention is to provide a lighting fixture including a lamp pivotally secured to a neck portion by an axial pivoting device having a magnet secured on the lamp end and a ferromagnetic disk fixed on the end of the neck portion for a mutual magnetic attraction with each other between the magnet and the ferromagnetic disk, at least a supporting arm pivotally secured with the neck portion by a transverse pivoting device having a magnet secured to a neck portion and a ferromagnetic plate secured to the arm for their mutual magnetic attraction, and a base rotatably secured with the supporting arm by a bottom pivoting means having a magnet secured on a lower portion of the supporting arm and a ferromagnetic disk secured on the base for their mutual magnetic attraction, whereby upon a pivotal movement or relative rotation between each magnet and each corresponding ferromagnetic disk or plate of the coupling parts, such as: the lamp and the neck portion, the neck portion with the supporting arm, and the arm with the base, the lamp can be optionally adjusted to any desired orientation and position as "locked" by magnetic attraction between the relevant coupling parts.

DETAILED DESCRIPTION

As shown in FIGS. 1-10, the present invention comprises: a lamp means 1, a neck portion 2, an axial pivoting means 3, a first supporting arm 4 pivotally connected with the neck portion 2 by a first horizontal pivoting means 5, and pivotally connected with a second supporting arm 6 pivotally connected with the first supporting arm 4 by a second horizontal pivoting means 7, and a base portion 8 pivotally connected with the second supporting arm 6 by a bottom pivoting means 9. The first and second supporting arms 4, 6 may be cooperatively designated as a "supporting arm means".

The first and second supporting arms 4, 6 may be simplified to a single supporting arm (not shown) or multiple linking arms (not shown), which are not limited in this invention. Other shapes, pivoting mechanisms or linking structures may be modified by those skilled in the art.

Figure 2:
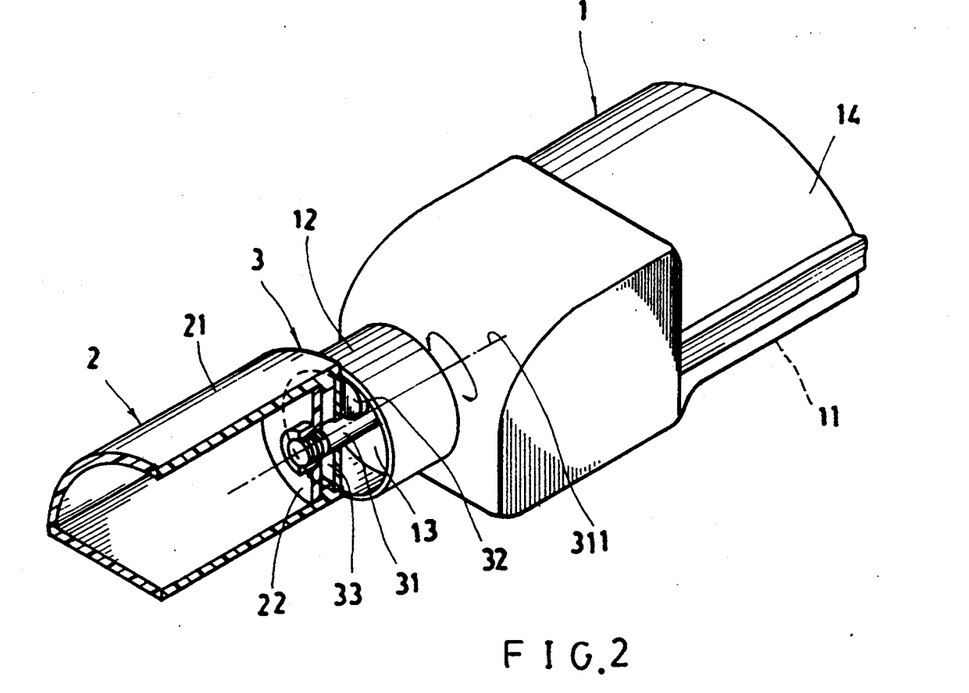
FIG. 2 shows a first coupling structure by pivotally connecting the lamp with the neck portion of the present invention.
Figure 3:
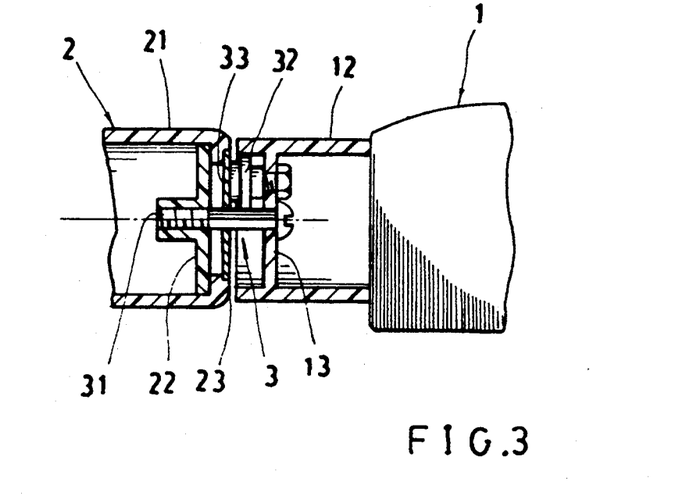
FIG. 3 is an enlarged sectional drawing showing the pivotal connection between the lamp and the neck portion.

The lamp means 1 includes: a lamp 11 which may be a fluorescent lamp or a bulb having a shade or reflector 14 disposed around the lamp 11, a coupling tube 12 secured to an end portion of the lamp 11, and a lamp retainer plate 13 formed on an end portion of the coupling tube 12 opposite to the lamp 11 for securing a magnet 32 of the axial pivoting means 3 on an outer surface of the lamp retainer plate 13 with the magnet 32 facing the neck portion 2.

The neck portion 2 includes: a first coupling portion 21 having a neck retainer plate 22 secured on an outer portion of the first coupling portion 21 for fixing a coupling shaft 31 of the axial pivoting means 3 on the neck retainer plate 22 for rotatably coupling the lamp means 1 by inserting the coupling shaft 31 through the lamp retainer plate 13 of the lamp means 1, an outermost neck end portion 23 of the first coupling portion 21 secured with a ferromagnetic disk 33 on the outermost neck end portion 23 to allow the ferromagnetic disk 33 to be rotatably slidably contacted with the magnet 32 of the axial pivoting means 3 for magnetically attracting the magnet 32 with the ferromagnetic disk 33 for magnetically attracting the lamp means 1 with the neck portion 2 for positioning the lamp means 1 on the neck portion 2, with the coupling shaft 31 of the axial pivoting means 3 defining a longitudinal axis 311 in a longitudinal center of the coupling shaft 31 longitudinally inserted in a center of the lamp retainer plate 13, a center of the ferromagnetic disk 33 and a center of the neck retainer plate 22 for rotating the lamp means 1 about the longitudinal axis 311 of the coupling shaft 31, and a second coupling portion 26 for pivotally connecting the neck portion 2 with the supporting arm means 4, 6.

Figure 1:
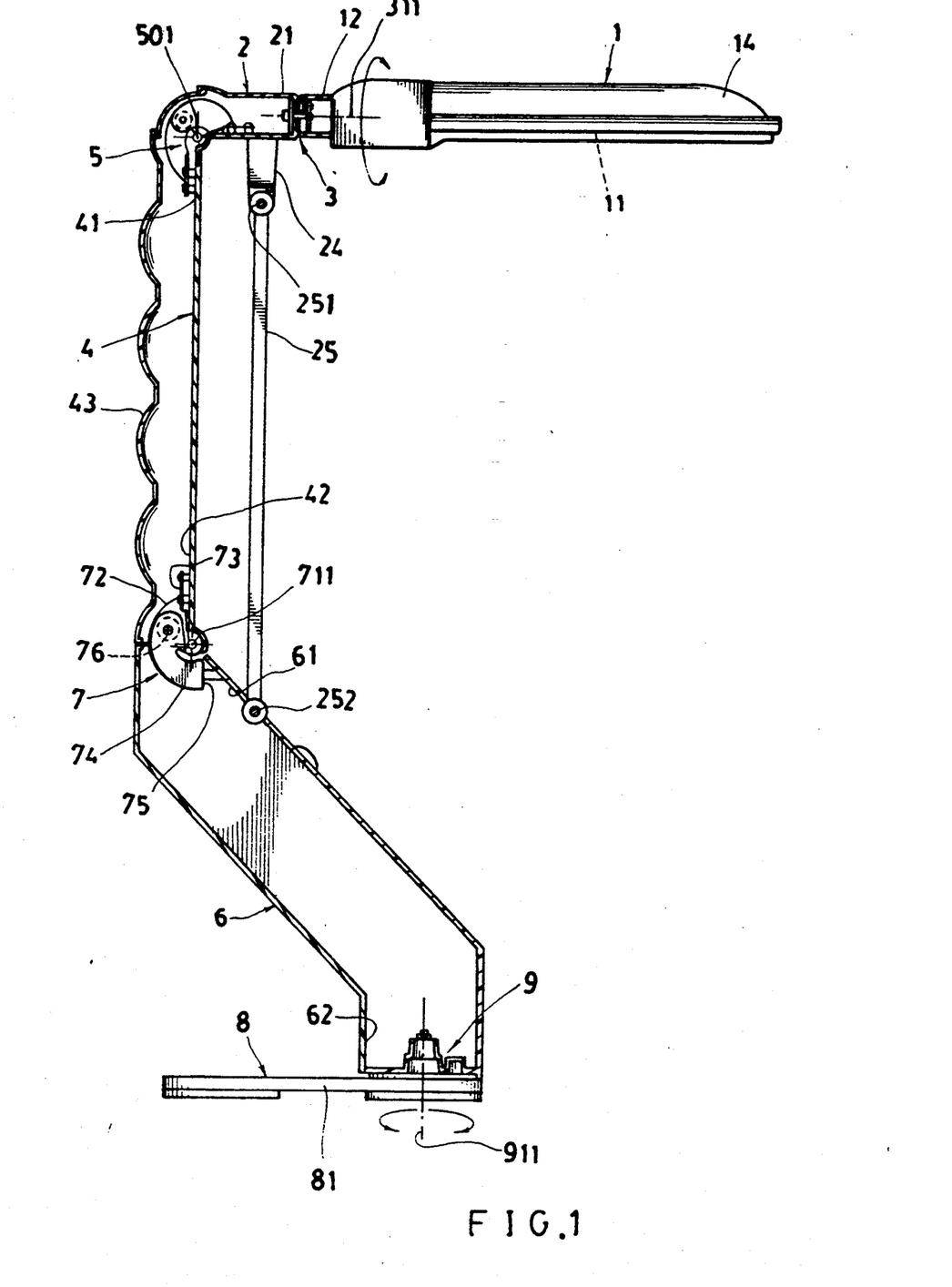
FIG. 1 is an illustration showing a complete set of the present invention.

The supporting arm means 4, 6 includes: a first supporting arm 4 pivotally connected with the neck portion 2 by a first horizontal pivoting means 5, and a second supporting arm 6 pivotally connected with the first supporting arm 4 by a second horizontal pivoting means 7, with the second supporting arm 6 pivotally mounted on a base portion 8 by a bottom pivoting means 9.

Figure 4:
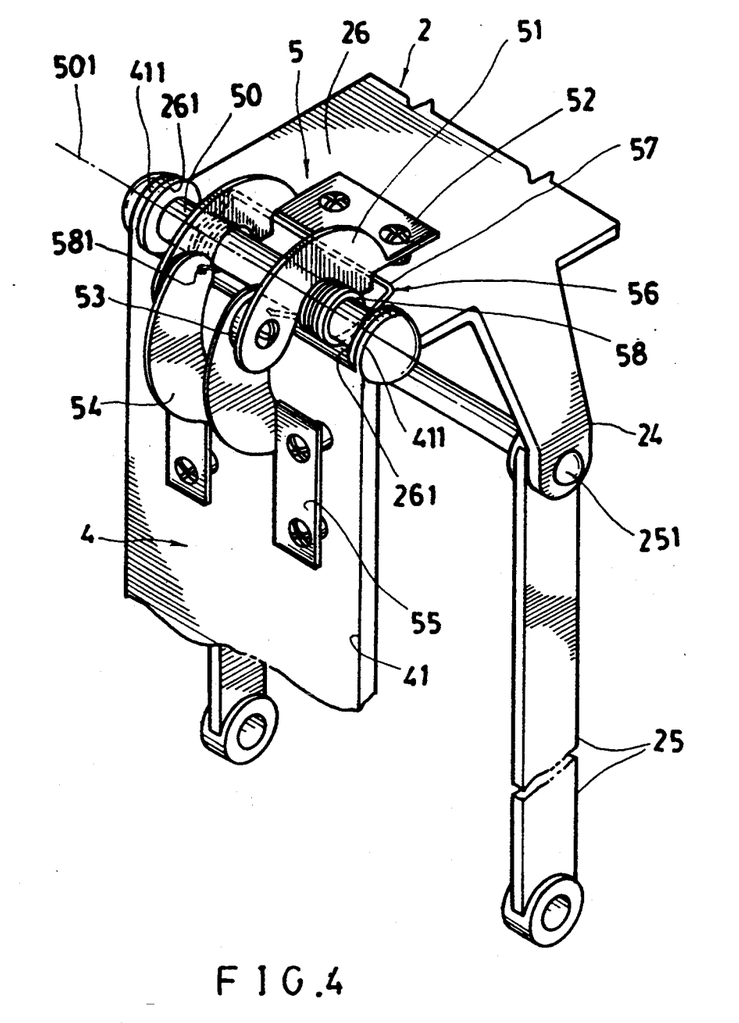
FIG. 4 is a perspective view showing a pivotal connection between the neck portion and a first supporting arm of the present invention.
Figure 6:
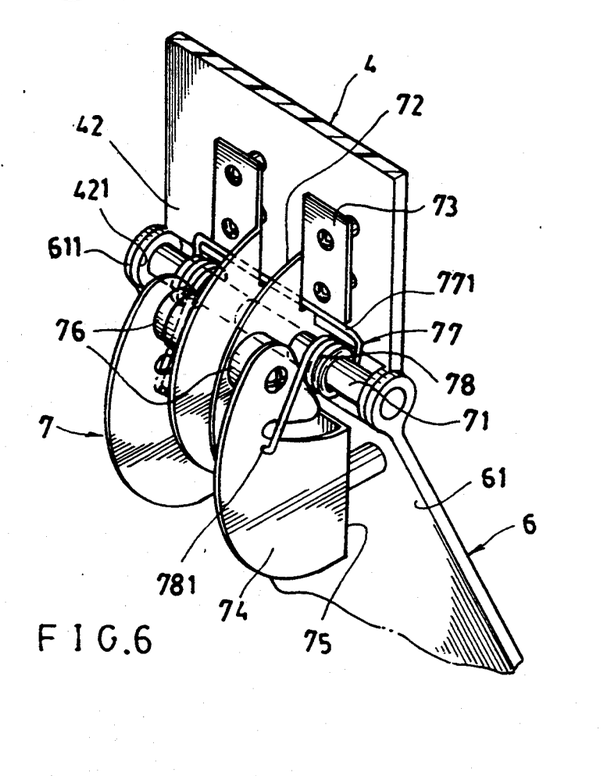
FIG. 6 is a perspective view showing a pivotal connection between a first and a second supporting arm.

The first supporting arm 4 includes: a first arm portion 41 formed on an upper portion of the first supporting arm 4, having a lower hinge flap 411 protruding upwardly from the first arm portion 41 to be pivotally coupled, by a first transverse coupling shaft 50 of the first horizontal pivoting means 5, with an upper hinge flap 261 protruding sidewardly from a second coupling portion 26 of the neck portion 2 opposite to a first coupling portion 21 for pivotally connecting the lamp means 1; a second arm portion 42 formed on a lower portion of the first supporting arm 4, having an inner hinge flap 421 protruding downwardly from the second arm portion 42 to be pivotally coupled, by a second transverse coupling shaft 71 of a second horizontal pivoting means 7, with an outer hinge flap 611 protruding upwardly from an upper arm portion 61 of the second supporting arm 6 for pivotally connecting the first and the second supporting arms 4, 6; and a flexible cover 43 for shielding the two horizontal pivoting means 5, 7.

Figure 5:
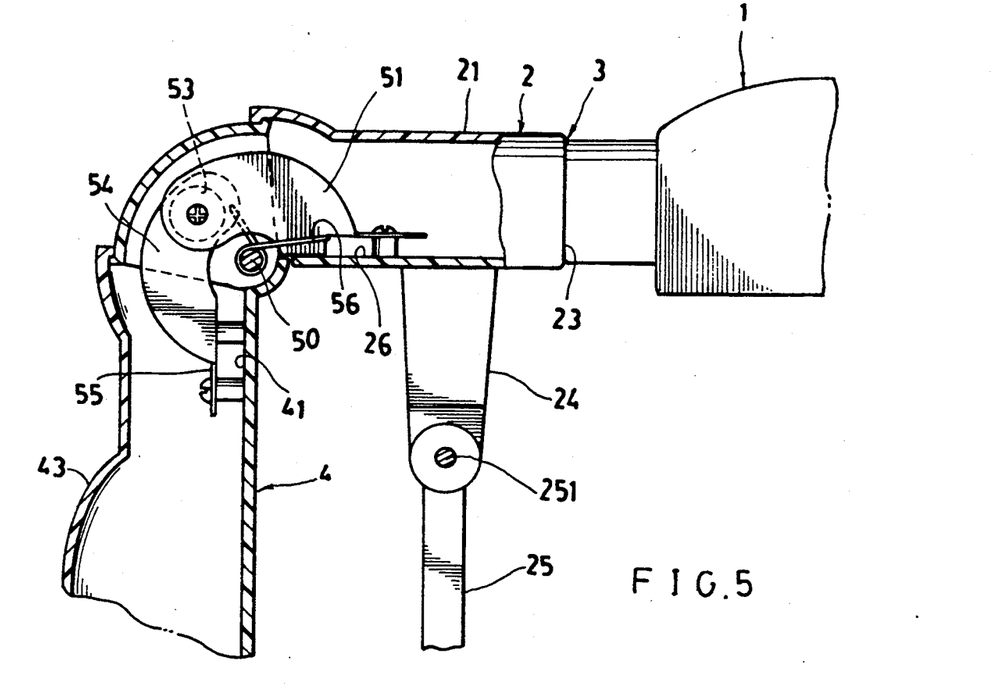
FIG. 5 is a sectional drawing showing the pivotal connection between the neck portion and the first supporting arm.

The first horizontal pivoting means 5 includes: the first transverse coupling shaft 50 defining a first transverse axis 501 projectively perpendicular to a longitudinal axis 311 defined by a coupling shaft 31 of an axial pivoting means 3 pivotally connecting the neck portion 2 and the lamp means 1, a pair of upper arcuate plates 51 with an upper fixing plate 52 secured on the neck portion 2, a pair of magnets 53 respectively secured on the pair of upper arcuate plates 51, a pair of lower arcuate ferromagnetic plates 54 each ferromagnetic plate 54 having a lower fixing plate 55 secured on the first arm portion 41 of the first supporting arm 4, and an upper tension spring 56 auxiliary resiliently linking and fastening the pair of upper arcuate plates 51 with the pair of lower arcuate ferromagnetic plates 54, each upper arcuate plate 51 and each lower arcuate ferromagnetic plate 54 having a radius about the first transverse axis 501 slightly larger than a radius of the magnet 53 about the first transverse axis 501 for a cooperative rotatable slidable contacting between each magnet 53 and each lower arcuate ferromagnetic plate 54 for magnetically attracting each magnet 53 with each lower arcuate ferromagnetic plate 54 for magnetically attracting the neck portion 2 and the first supporting arm 4 at an adjusted position.

The upper tension spring 56 includes: a spring rod 57 retained on the pair of upper arcuate plates 51, a pair of spring-ring members 58, each spring-ring member having a plurality of spring rings, disposed on two opposite side portions of the spring rod 57 for fastening the pair of upper arcuate plates 51, the two magnets 53, and the pair of lower arcuate ferromagnetic plates 54 with a spring end 581 of each spring-ring member 58 retained on each lower arcuate ferromagnetic plate 54, thereby resiliently fastening and linking the pair of upper arcuate plates 51 with the pair of the lower arcuate ferromagnetic plates 54 for preventing loosening or separation of the neck portion 2 and the first supporting arm 4.

Figure 7:
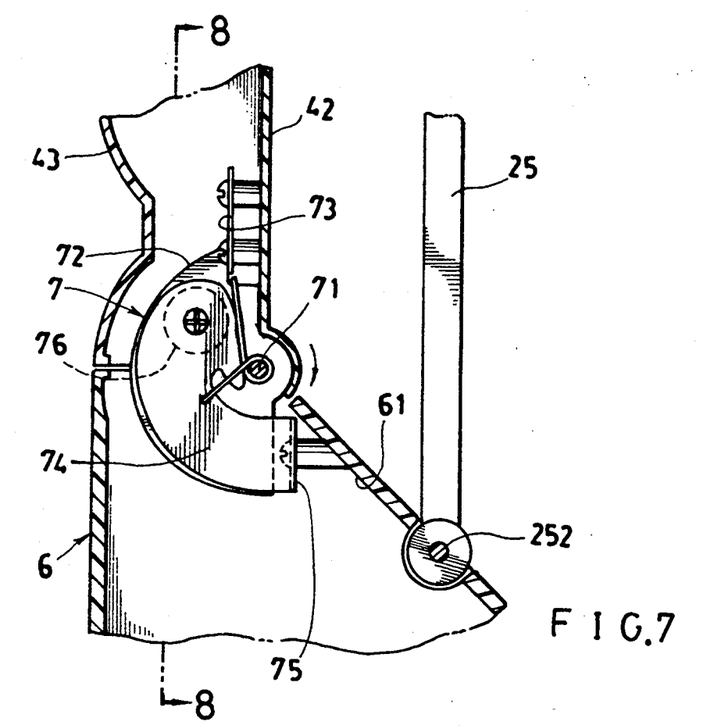
FIG. 7 is a sectional drawing showing a pivotal connection between the first and second supporting arm.

The second horizontal pivoting means 7 includes: the second transverse coupling shaft 71 defining a second transverse axis 711, parallel to a first transverse axis 501 of the first transverse coupling shaft 50, and pivotally connecting the first supporting arm 4 and the second supporting arm 6, a pair of upper arcuate ferromagnetic plates 72 each having an upper fixing plate 73 secured on a second arm portion 42 of the first supporting arm 4, a pair of lower arcuate plates 74 having a lower fixing plate 75 secured to the upper arm portion 61 of the second supporting arm 6, a pair of magnets 76 each magnet 76 secured on each lower arcuate plate 74 and rotatably slidably contacting each upper arcuate ferromagnetic plate 72 when pivotally moving the first supporting arm 4 with respect to the second supporting arm 6 about the second transverse coupling shaft 71 for magnetically attracting each magnet 76 with each upper arcuate ferromagnetic plate 72 for attracting the first and the second supporting arms 4, 6 at an adjusted position, and a lower tension spring 77 auxiliary resiliently linking and fastening the pair of upper arcuate ferromagnetic plates 72 with the pair of lower arcuate plates 74 for preventing loosening and separation of the first and the second supporting arms 4, 6.

Figure 8:
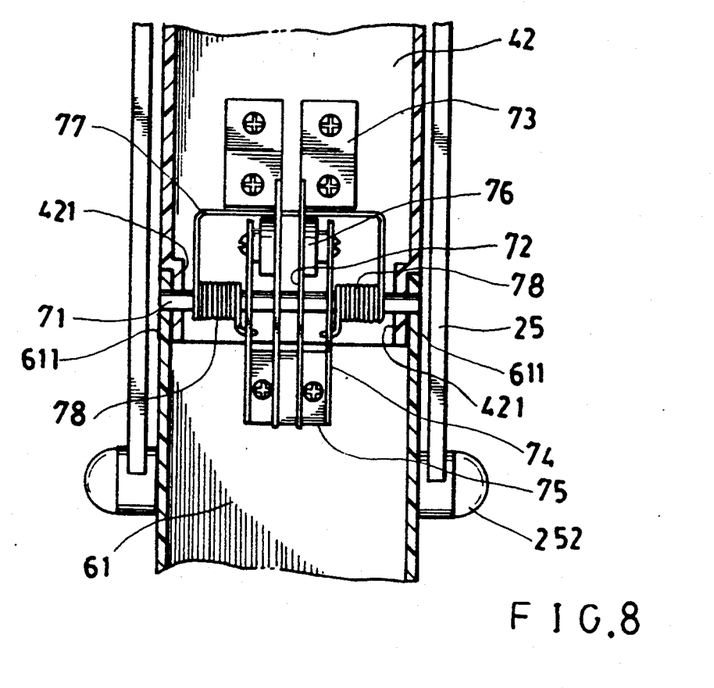
FIG. 8 is a rear view as viewed from 8—8 direction of FIG. 7.

The lower tension spring 77 includes: a spring rod 771 retained on the pair of upper arcuate ferromagnetic plates 72, a pair of spring-ring members 78, each spring-ring member 78 having a plurality of spring rings and disposed on two opposite side portions of the spring rod 771 for resiliently fastening the pair of lower arcuate plates 74, the two magnets 76, and the pair of the upper arcuate ferromagnetic plates 72, each spring-ring member 78 having a spring end 781 retained on each lower arcuate plate 74, thereby resiliently fastening the first and the second supporting arms 4, 6.

Figure 9:
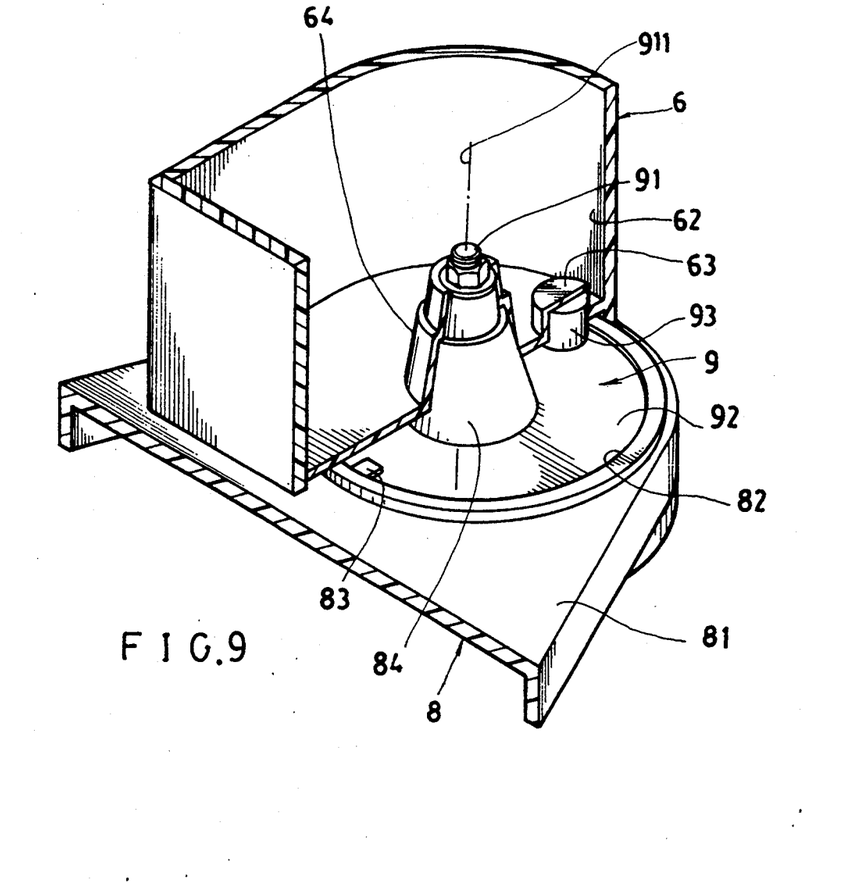
FIG. 9 is a partial perspective view showing a pivotal connection between the second supporting arm and a base.
Figure 10:
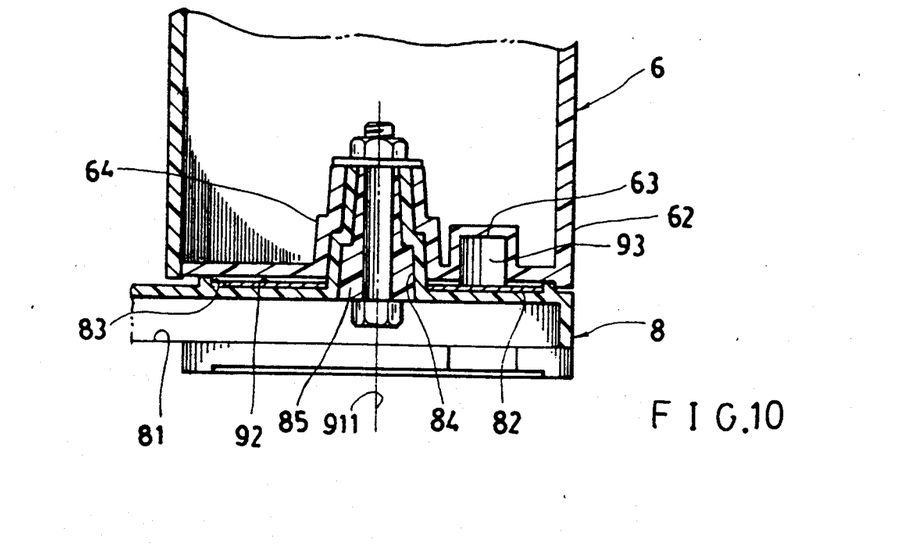
FIG. 10 is a sectional drawing showing the pivotal connection between the second supporting arm and the base.

The bottom pivoting means 9 includes: a vertical coupling shaft (or bolt) 91 defining a vertical axis 911 and rotatably coupling the second supporting arms 6 and the base portion 8, a magnet 93 retained in a magnet socket 63 formed on a lower arm portion 62 of the second supporting arm 6, and a ferromagnetic disk 92 fixed in a disk recess 82 recessed in a base plate 81 of the base portion 8 as locked by a retaining protrusion 83 secured on the base portion 8, with the magnet 93 magnetically attracting the ferromagnetic disk 92 for magnetically attracting the second supporting arm 6 on the base portion 8 after rotating the second supporting arm 6 on the base portion 8 about the vertical axis 911 to thereby rotate a lamp means 1 about the vertical axis 911 to a desired position.

The second supporting arm 6 has an outer sleeve 64 formed on a central bottom portion of the second supporting arm 6 and rotatably engageable with an inner sleeve 84 formed on a central portion of the base plate 81 of the base portion 8, the inner sleeve 84 surrounding the vertical coupling shaft 91 having a packing 85 concentrically disposed about the vertical coupling shaft 91 and inserted in between the vertical shaft 91 and the inner sleeve 84, whereby upon rotation of the outer sleeve 64 of the second supporting arm 6 about the inner sleeve 84 of the base portion 8, the magnet 93 will be slid on the ferromagnetic disk 92 until a desired position of a rotating angle.

The neck portion 2 includes a bracket 24 protruding downwardly from a first coupling portion 21 of the neck portion 2 for pivotally connecting an upper disk end 251 of an auxiliary link 25 juxtapositional to the first supporting arm 4, the auxiliary link 25 having a lower link end 252 pivotally connected with an upper arm portion 61 of a second supporting arm 6 for forming a parallelogram linkage among the auxiliary link 25, the neck portion 2, the first supporting arm 4 and the second supporting arm 6 for a stable pivotal movement of the parallelogram linkage for free adjusting a height and orientation of the lamp means 1.

Accordingly, this application provides a lighting fixture for an instantly positioning of the lamp 11 pivotally secured on the neck portion 2, the supporting arm means 4, 6 and the base portion 8 by magnetically attracting each magnet with its corresponding ferromagnetic disk or plate without further loosening and fastening a knob on a pivotal joint as found in a conventional lighting fixture as shown in FIG. 11, thereby rendering

I claim:

1. A lighting fixture comprising:

a lamp means pivotally secured to a neck portion by an axial pivoting means axially mounted in between said lamp means and said neck portion, having a first magnetic means and a first ferromagnetic means respectively secured to said lamp means and said neck portion;

a supporting arm means having an upper end portion of said supporting arm means pivotally connected to said neck portion by a horizontal pivoting means having a second magnetic means and a second ferromagnetic means respectively secured to said arm means and said neck portion, and having a lower end portion of said supporting arm means pivotally mounted on a base portion by a bottom pivoting means having a third magnetic means and a third ferromagnetic means respectively secured to said supporting arm means and said base portion; each said first, second, and third magnetic means and each of the first second and third ferromagnetic means rotatably slidably contacting with each other and magnetically attracting with each other, whereby upon a first pivotal movement between said lamp means and said neck portion, a second pivotal movement between said neck portion and said supporting arm means, and a third pivotal movement between said supporting arm means and said base portion, an optional desired positioning of the lighting fixture after universally adjusting orientations of the lighting fixture will be instantly obtained due to magnetic attraction between each said magnetic means and each said ferromagnetic means.

2. A lighting fixture according to claim 1, wherein said first ferromagnetic means is a first ferromagnetic disk.

3. A lighting fixture according to claim 2, wherein said lamp means (1) including: a lamp (11) having a shade (14) disposed around the lamp (11), a coupling tube (12) secured to an end portion of the lamp (11), and a lamp retainer plate (13) formed on an end portion of the coupling tube (12) opposite to the lamp (11) for securing said first magnetic means (32) of the axial pivoting means (3) on an outer surface of the lamp retainer plate (13) with said first magnetic means (32) facing the neck portion (2); and said neck portion (2) including: a first coupling portion (21) having a neck retainer plate (22) secured on an outer portion of the first coupling portion (21) for fixing a coupling shaft (31) of the axial pivoting means (3) on the neck retainer plate (22) for rotatably coupling the lamp means (1), by inserting the upper coupling shaft (31) through the lamp retainer plate (13) of the lamp means (1), an outermost neck end portion (23) of the first coupling portion (21) secured with a first ferromagnetic disk (33) on the outermost neck end portion (23) to allow said a first ferromagnetic disk (33) to be rotatably slidably contacted with the first magnetic means (32) of the axial pivoting means (3) for magnetically attracting the first magnetic means (32) with the ferromagnetic disk (33) for magnetically attracting the lamp means (1) with the neck portion (2) for positioning the lamp means (1) with the neck portion (2), with the coupling shaft (31) of the axial pivoting means (3) defining a longitudinal axis (31) in a longitudinal center of the coupling shaft (31) longitudinally inserted in a center of the lamp retainer plate (13), a center of the ferromagnetic disk (33) and a center of the neck retainer plate (22) for rotating the lamp means (1) about the longitudinal axis (311) of the coupling shaft (31), and a second coupling portion (26) for pivotally connecting the neck portion with the supporting arm means.

4. A lighting fixture according to claim 3, wherein said supporting arm means includes: a first supporting arm (4) pivotally connected with the neck portion (2) by a first horizontal pivoting means (5), and a second supporting arm (6) pivotally connected with the first supporting arm (4) by a second horizontal pivoting means (7), with the second supporting arm (6) pivotally mounted on the base portion (8) by the bottom pivoting means (9).

5. A lighting fixture according to claim 4, wherein said first supporting arm (4) includes: a first arm portion (41) formed on an upper portion of the first supporting arm (4), having a lower hinge flap (411) protruding upwardly from the first arm portion (41) to be pivotally coupled, by a first transverse coupling shaft (50) of the first horizontal pivoting means (5), with an upper hinge flap (261) protruding sidewardly from a second coupling portion (26) of the neck portion (2) opposite to the first coupling portion (21) for pivotally connecting the lamp means (1); a second arm portion (42) formed on a lower portion of the first supporting arm (4), having an inner hinge flap (421) protruding downwardly from the second arm portion (42) to be pivotally coupled, by a second transverse coupling shaft (71) of a second horizontal pivoting means (7), with an outer hinge flap (611) protruding upwardly from an upper arm portion (61) of the second supporting arm (6) for pivotally connecting the first and the second supporting arms (4, 6) and a flexible cover (43) for shielding the first and second horizontal pivoting means (5, 7).

6. A lighting fixture according to claim 5, wherein said first horizontal pivoting means (5) includes: the first transverse coupling shaft (50) defining a first transverse axis (501) projectively perpendicular to a longitudinal axis (311) defined by a coupling shaft (31) of the axial pivoting means (3) pivotally connecting the neck portion (2) and the lamp means (1), a pair of upper arcuate plates (51) with an upper fixing plate (52) secured on the neck portion (2), said second magnetic means having a pair of second magnets (53) respectively secured on the pair of upper arcuate plates (51), said second ferromagnetic members having a pair of lower arcuate ferromagnetic plates (54) each ferromagnetic plate (54) having a first lower fixing plate (55) secured on the first arm portion (41) of the first supporting arm (4), and an upper tension spring (56) auxiliary resiliently linking and fastening the pair of upper arcuate plates (51) with the pair of lower arcuate ferromagnetic plates (54), each upper arcuate plate (51) and each lower arcuate ferromagnetic plate (54) having a radius about the first transverse axis (501) slightly larger than a radius of each second magnet (53) about the first transverse axis (501) for a cooperative rotatable slidable contacting between each magnet (53) and each lower arcuate ferromagnetic plate (54) for magnetically attracting each second magnet (53) with each lower arcuate ferromagnetic plate (54) for magnetically attracting the neck portion (2) and the first supporting arm (4) at a first adjusted position.

7. A lighting fixture according to claim 6, wherein said upper tension spring (56) includes: a first spring rod (57) retained on the pair of upper arcuate plates (51), a pair of first spring-ring members (58), each said first spring-ring member having a plurality of first spring rings, disposed on two opposite side portions of the first spring rod (57) for fastening the pair of upper arcuate plates (51), the two second magnets (53), and the pair of lower arcuate ferromagnetic plates (54) with a first spring end (581) of each first spring-ring member (58) retained on each lower arcuate ferromagnetic plate (54), thereby resiliently fastening and linking the pair of upper arcuate plates (51) with the pair of the lower arcuate ferromagnetic plates (54) for preventing loosening or separation of the neck portion (2) and the first supporting arm (4).

8. A lighting fixture according to claim 5, wherein said second horizontal pivoting means (7) includes: the second transverse coupling shaft (71) defining a second transverse axis (711), parallel to a first transverse axis (501) of the first transverse coupling shaft (50), and pivotally connecting the first supporting arm (4) and the second supporting arm (6), said fourth ferromagnetic means having a pair of upper arcuate ferromagnetic plates (72) each having an second upper fixing plate (73) secured on a second arm portion (42) of the first supporting arm (4), a pair of lower arcuate plates (74) having a second lower fixing plate (75) secured to the upper arm portion (61) of the second supporting arm (6), a fourth magnetic means having a pair of fourth magnets (76) each fourth magnet (76) secured on each lower arcuate plate (74) and rotatably slidably contacting each upper arcuate ferromagnetic plate (72) when pivotally moving the first supporting arm (4) with respect to the second supporting arm (6) about the second transverse coupling shaft (71) for magnetically attracting each fourth magnet (76) with each upper arcuate ferromagnetic plate (72) for attracting the first and the second supporting arms (4, 6) at an second adjusted position, and a lower tension spring (77) auxiliary resiliently linking and fastening the pair of upper arcuate ferromagnetic plates (72) with the pair of lower arcuate plates (74) for preventing loosening and separation of the first and the second supporting arms (4, 6).

9. A lighting fixture according to claim 6, wherein said lower tension spring (77) includes: a second spring rod (771) retained on the pair of upper arcuate ferromagnetic plates (72), a pair of second spring-ring members (78), each said second spring-ring member (78) having a plurality of second spring rings and disposed on two opposite side portions of the spring rod (771) for resiliently fastening the pair of lower arcuate plates (74), the two fourth magnets (76), and the pair of the upper arcuate ferromagnetic plates (72), each second spring-ring member (78) having a second spring end (781) retained on each lower arcuate plate (74), thereby resiliently fastening the first and the second supporting arms (4, 6).

10. A lighting fixture according to claim 4, wherein said bottom pivoting means (9) includes: a vertical coupling shaft (91) defining a vertical axis (911) and rotatably coupling the second supporting arms (6) and the base portion (8), the third magnetic means having a third magnet (93) retained in a magnet socket (63) formed on the lower arm portion (62) of the second supporting arm (6), and a second ferromagnetic disk (92) fixed in a disk recess (82) recessed in a base plate (81) of the base portion (8) as locked by a retaining protrusion (83) secured on the base portion (8), with the third magnet (93) magnetically attracting the second ferromagnetic disk (92) for magnetically attracting the second supporting arm (6) on the base portion (8) after rotating the second supporting arm (6) on the base portion (8) about the vertical axis to thereby rotate a lamp means (1) about the vertical axis (911) to a first desired position.

11. A lighting fixture according to claim 10, wherein said second supporting arm (6), has an outer sleeve (64) formed on a central bottom portion of the second supporting arm (6) and rotatably engageable with an inner sleeve (84) formed on a central portion of the base plate (81) of the base portion (8), the inner sleeve (84) surrounding the vertical coupling shaft (91) having a packing (85) concentrically disposed about the vertical coupling shaft (91) and inserted in between the vertical shaft (91) and the inner sleeve (85), whereby upon rotation of the outer sleeve (64) of the second supporting arm (6) about the inner sleeve (84) of the base portion (8), the third magnet (93) will be slid on the second ferromagnetic disk (92) until a second desired position of a rotating angle.

12. A lighting fixture according to claim 3, wherein said neck portion (2) includes a bracket (24) protruding downwardly from a first coupling portion (21) of the neck portion (2) for pivotally connecting an upper disk end (251) of an auxiliary link (25) juxtapositional to the first supporting arm (4), the auxiliary link (25) having a lower link end (252) pivotally connected with an upper arm portion (61) of a second supporting arm (6) for forming a parallelogram linkage among the auxiliary link (25), the neck portion (2), the first supporting arm (4) and the second supporting arm (6) for a stable pivotal movement of the parallelogram linkage for free adjusting a height and orientation of the lamp means (1).

* * * * *